United States Patent
Gines

(10) Patent No.: US 12,556,321 B1
(45) Date of Patent: Feb. 17, 2026

(54) METHODS AND OSCILLOSCOPES FOR MEASURING JITTER IN DIGITAL SIGNALS

(71) Applicant: Keysight Technologies, Inc., Santa Rosa, CA (US)

(72) Inventor: David L. Gines, Fort Collins, CO (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 94 days.

(21) Appl. No.: 18/671,259

(22) Filed: May 22, 2024

(51) Int. Cl.
*H04L 1/20* (2006.01)

(52) U.S. Cl.
CPC .................... *H04L 1/205* (2013.01)

(58) Field of Classification Search
CPC ........................................................ H04L 1/205
USPC ............................................................ 375/226
See application file for complete search history.

(56) References Cited

U.S. PATENT DOCUMENTS

| 8,861,578 B1 * | 10/2014 | Lusted | ................ | H04B 17/104 |
| | | | | 375/353 |
| 9,344,203 B2 | 5/2016 | Ran | | |
| 2014/0169429 A1 * | 6/2014 | Ran | ........................ | H04L 1/248 |
| | | | | 375/226 |

OTHER PUBLICATIONS

Marianne Nourzad et al., "PAM4 Signals Testing Considerations: Learnings from PCIe and Ethernet/OIF-CEI for 100+Gb/s per Lane," DesignCon 2024, pp. 1-37.

\* cited by examiner

*Primary Examiner* — Leila Malek

(57) ABSTRACT

A method for measuring even/odd jitter (EOJ) in digital signals includes receiving a signal under test (SUT), where the SUT includes a waveform of even symbols and odd symbols constituting an even-length test pattern. The method further includes generating a first pulse-fit vector for the even symbols of the waveform and a second pulse-fit vector for odd symbols of the waveform, and determining the EOJ of the SUT by measuring and comparing respective widths of the first and second pulse-fit vectors.

20 Claims, 7 Drawing Sheets

METHODS AND OSCILLOSCOPES FOR MEASURING JITTER IN DIGITAL SIGNALS

FIELD

The present disclosure generally relates to the field of digital data communications, and more specifically, to methods for measuring even/odd jitter in digital signals using pulse-fit analysis.

BACKGROUND

Real-time oscilloscopes and sampling oscilloscopes are often used to characterize high-speed digital data. These oscilloscopes are part of several industry protocols, such as universal serial bus (USB), ethernet, or peripheral component interconnect express (PCIe). These protocols rely on data processing algorithms and statistical methods to determine compliance with official specifications.

One of the metrics used to assess performance in these protocols is timing fidelity, also known as jitter measurements. In a typical timing measurement, the time at which an edge crosses a vertical threshold, transitioning from one logic state to another, is compared to a reference time. This reference time could be supplied by an explicit clock or recovered from the data itself using signal processing.

Jitter can be decomposed into different types, one of which is even/odd jitter (EOJ). EOJ can occur when the data-generating clock has duty-cycle distortion, meaning that the rising edge of the clock is consistently early or late, while the falling edge of the clock is consistently late or early. This results in every other symbol, or bit, being either early or late. The difference between these two timing biases is defined as EOJ.

SUMMARY

According to an aspect of the inventive concepts, a method for measuring even/odd jitter (EOJ) in digital signals is provided. The method includes receiving a signal under test (SUT), where the SUT includes a waveform of even symbols and odd symbols constituting an even-length test pattern. The method further includes generating a first pulse-fit vector for the even symbols of the waveform and a second pulse-fit vector for odd symbols of the waveform, and determining the EOJ of the SUT by measuring and comparing respective widths of the first and second pulse-fit vectors.

The first pulse-fit vector and the second pulse-fit vector may be generated using a pulse-fit analysis, and the pulse-fit analysis may be based on a model symbol for the waveform. The model symbol may be defined as $y = xe*pe + xo*po$, where y is the set of waveform samples, pe is a pulse-fit vector for the even symbols, po is a pulse-fit vector for the odd symbols, xe is a set of idealized waveform samples based on even symbol values as defined by the test pattern, xo is a set of idealized waveform samples based on odd symbol values as defined by the test pattern, and * denotes convolution.

The respective widths of the first and second pulse-fit vectors may be measured at 50 percent of a height of the first and second pulse-fit vectors, and the EOJ may be determined as the absolute value of $((we-wo)/2$, where we is the width of the first pulse-fit vector, and wo is the width of the second pulse-fit vector.

The first and second pulse-fit vectors may be generated from a given number of even and odd symbols of the waveform, where the waveform includes at least data dependent jitter (DDJ) in addition to the EOJ. The given number of even and odd symbols may be sufficiently high such that $(\text{mean}(oddDDJ) - \text{mean}(evenDDJ) \approx 0$, where mean(oddDDJ) is a mean DDJ of the odd symbols and mean(evenDDJ) is a mean DDJ of the even symbols. Therefore, DDJ does not adversely affect the EOJ estimate, since it is averaged out during the pulse fit construction.

The method may be implemented by a processor of an oscilloscope, the oscilloscope having an input port receiving the SUT. The SUT may be generated by a device under test (DUT), and the DUT may be an oscillator.

According to another aspect of the inventive concept, a non-transitory computer readable medium is provided. The non-transitory computer readable medium stores instructions which when executed by a processor cause the processor to carry out the method described above. The processor may be embedded in an oscilloscope.

According to yet another aspect of the inventive concepts, an oscilloscope is provided. The oscilloscope includes an input port configured to receive a signal under test (SUT), the SUT including a waveform of even symbols and odd symbols constituting an even-length test pattern. The oscilloscope further includes a sampling circuit configured to sample the waveform of even symbols and odd symbols, and to output a digital signal corresponding to the waveform of even symbols and odd symbols. The oscilloscope still further includes a processor configured to process the digital signal by measuring even/odd jitter (EOJ) of the SUT by generating a first pulse-fit vector for the even symbols of the waveform and a second pulse-fit vector for odd symbols of the waveform, and by determining the EOJ of the SUT by measuring and comparing respective widths of the first and second pulse-fit vectors.

The first pulse-fit vector and the second pulse-fit vector may be generated using a pulse-fit analysis, and the pulse-fit analysis may be based on a model symbol for the waveform. The model symbol may be defined as $y = xe*pe + xo*po$, where y is the set of waveform samples, pe is a pulse-fit vector for the even symbols, po is a pulse-fit vector for the odd symbols, xe is a set of idealized waveform samples based on even symbol values as defined by the test pattern, xo is a set of idealized waveform samples based on odd symbol values as defined by the test pattern, and * denotes convolution.

The respective widths of the first and second pulse-fit vectors may be measured at 50 percent of a height of the first and second pulse-fit vectors, and the EOJ may be determined as the absolute value of $((we-wo)/2$, where we is the width of the first pulse-fit vector, and wo is the width of the second pulse-fit vector.

The first and second pulse-fit vectors may be generated from a given number of even and odd symbols of the waveform, where the waveform includes at least data dependent jitter (DDJ) in addition to the EOJ. The given number of even and odd symbols may be sufficiently high such that $(\text{mean}(oddDDJ) - \text{mean}(evenDDJ) \approx 0$, where mean(oddDDJ) is a mean DDJ of the odd symbols and mean(evenDDJ) is a mean DDJ of the even symbols. Therefore, DDJ does not adversely affect the EOJ estimate, since it is averaged out during the pulse fit construction.

BRIEF DESCRIPTION OF DRAWINGS

The above and other aspects and features of the inventive concepts will become readily apparent from the detailed description that follows, with reference to the accompanying drawings, in which.

DETAILED DESCRIPTION

Figure 1:
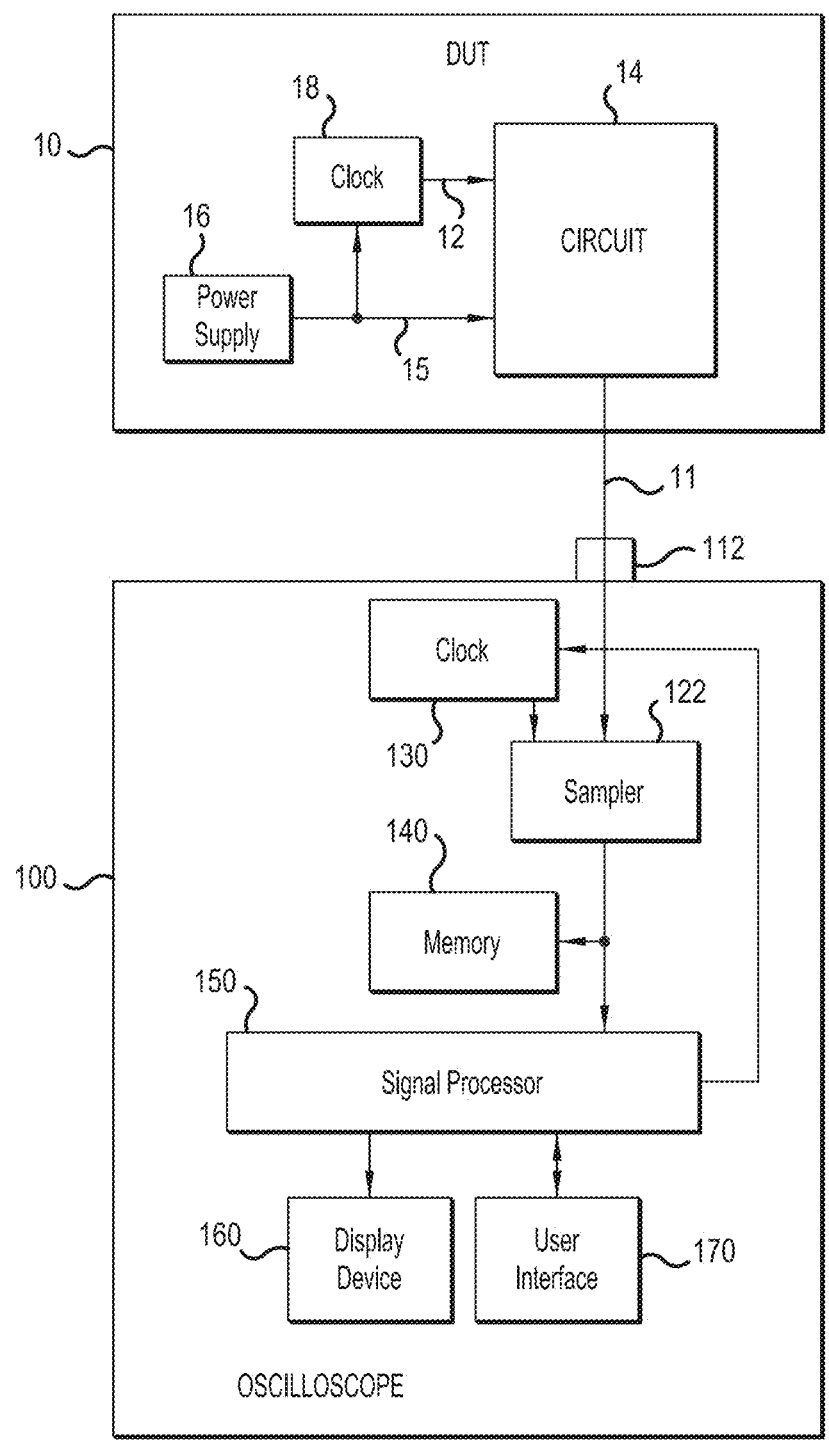
FIG. 1 illustrates a simplified block diagram of a real-time oscilloscope measuring system.

In the following detailed description, for purposes of explanation and not limitation, representative embodiments disclosing specific details are set forth in order to provide a thorough understanding of the present teachings. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted to avoid obscuring the description of the example embodiments. Such methods and apparatuses are clearly within the scope of the present teachings. Further, throughout the drawings, like reference numbers refer to the same or similar elements.

The terminology used herein is for purposes of describing particular embodiments only, and is not intended to be limiting. The defined terms are in addition to the technical and scientific meanings of the defined terms as commonly understood and accepted in the technical field of the present teachings. As used in the specification and appended claims, the terms 'a', 'an' and 'the' include both singular and plural referents, unless the context clearly dictates otherwise. Thus, for example, 'a device' includes one device and plural devices. Further, for example, when one element is described as being "connected to" another element, the one element may be directly connected to the other element, or indirectly connected to the other element in an operative manner.

Separately, as is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, in the absence of an indication to the contrary, the units and/or modules being implemented by microprocessors or similar may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the example embodiments. Conversely, the blocks, units and/or modules of the example embodiments may be physically combined into more complex blocks, units and/or modules without departing from the scope of the example embodiments.

Real-time oscilloscopes and sampling oscilloscopes are used to characterize high-speed digital data. Testing by real-time oscilloscopes is a part of several industry protocols, such as universal serial bus (USB), ethernet or peripheral component interconnect express (PCIe), which rely on data processing algorithms and statistical methods to determine compliance. Acceptable levels of performance, for a wide variety of metrics, are defined in official specifications for industry protocols.

FIG. 1 is a simplified block diagram of an example embodiment of a measurement instrument 100 which may be utilized to test the performance of a high-speed digital signal output by an exemplary device under test (DUT) 10.

In this example, the DUT 10 includes a circuit 14, for example a high speed digital communication circuit or oscillator, at least one power supply 16, and at least one clock 18. The circuit 14 is powered by one or more supply voltages, including at least one supply voltage 15 produced by the power supply 16. The circuit 14 also receives a clock signal 12 from the clock 18 and may use the clock signal 12 to control the timing of edges or bit transitions in one of more signals of the circuit 14.

In embodiments of the inventive concepts, the circuit 14 of the DUT 10 is configured to generate an output signal 11 in the form of even-length test patterns. This aspect of the inventive concepts will be described later therein.

In exemplary embodiments, the measurement instrument 100 may be a digital oscilloscope, and may include an input port 112 configured to receive the output signal 11 from the DUT 10, a clock 130, a sampler 122 configured to capture samples of the received output signal 11, a memory 140, a signal processor 150, a display device 160 and a user interface 170.

The sampler 122 may include an analog-to-digital converter (ADC) (not shown) which may be clocked in response to the clock 130 of the measurement instrument 100. In some embodiments, clock 130 may be recovered from the captured samples of the signal 11 by any of many clock recovery techniques known to those skilled in the art.

The display device 160 is not limited to any particular type of display technology, and may include a liquid crystal display (LCD), a plasma display, a cathode ray tube (CRT), or the like, together with the associated processor and software for implementing the display device 160. Likewise, the user interface 170 is also not limited, and may include one or more of a keyboard, a keypad, control knobs, a mouse, a trackball, buttons, indicator lights, and so on, together with the associated processor and software for implementing the user interface 170.

The memory 140 which may store therein digitized samples of the DUT signal 11 captured by sampler 122. In that case, in some embodiments the digitized samples may be communicated by the measurement instrument 100 under control of a controller or processor (not shown) via a communications interface (also not shown) to an external device such as a computer where the digitized samples may be processed as described below with respect to signal processor 150. The communication interface may be any suitable interface, for example conforming to standards such as Ethernet, specialized test instrument standards, etc. In some embodiments, the communication interface may allow the measurement instrument 100 to communicate commands and data with one or more external computers and/or other measurement instruments via the Internet.

The memory 140 may also include a working memory for the signal processor 150 including instructions, when executed the by the signal processor 150, carry out the methods of measuring the even/odd jitter (EOJ) of the DUT signal 11 as described later herein. The working memory storing the instructions can comprise random access memory (RAM), read only memory (ROM), optical read/write memory, cache memory, magnetic read/write memory, flash memory, and/or any other non-transitory computer readable storage medium.

In the case where EOJ is measured off-line of the measurement instrument 100, the aforementioned instructions would be stored in remote memory accessible by processor external the measurement instrument 100. Again, the remote working memory storing the instructions can comprise random access memory (RAM), read only memory (ROM), optical read/write memory, cache memory, magnetic read/write memory, flash memory, and/or any other non-transitory computer readable storage medium.

The measurement instrument 100 may include other components and subsystems not illustrated in FIG. 1.

Figure 2:
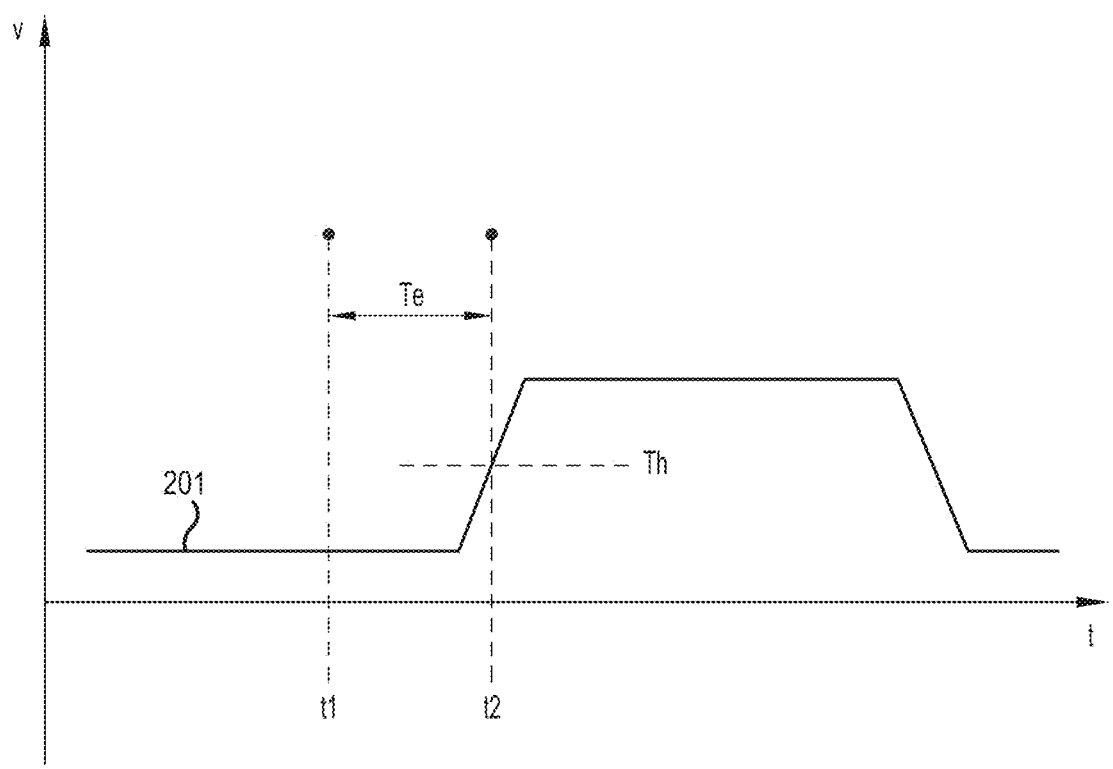
FIG. 2 is a timing diagram for reference in describing a timing error (Te) measurement for a sample edge of a pulse.

Timing fidelity, a.k.a. jitter measurements, represent a large family of tests carried on high-speed digital data. In a typical timing measurement on a real-time oscilloscope such as that of FIG. 1, the time at which an edge crosses a vertical threshold, on its way from one logic state to another, is compared to some reference time, as for example, supplied by an explicit clock, or as recovered from the data itself using signal processing. An example of this is shown in FIG. 2 which shows a timing error (Te) measurement for a sample edge of a pulse signal 201 is shown. The pulse signal 201 may represent a waveform that includes even and odd symbols. The timing error (Te) may be determined by comparing the time at which an edge of the pulse signal 201 crosses a threshold (Th) to a reference time. The reference time may be supplied by a clock signal, such as clock signal 12 of FIG. 1, or may be recovered from the data itself using signal processing techniques. The threshold (Th) may be a voltage threshold that is defined for the purpose of measuring the timing error (Te). The timing error (Te) may be represented in terms of time (t) on the x-axis. The timing error (Te) may be used to measure jitter, including even/odd jitter (EOJ), in the waveform.

Figure 3:
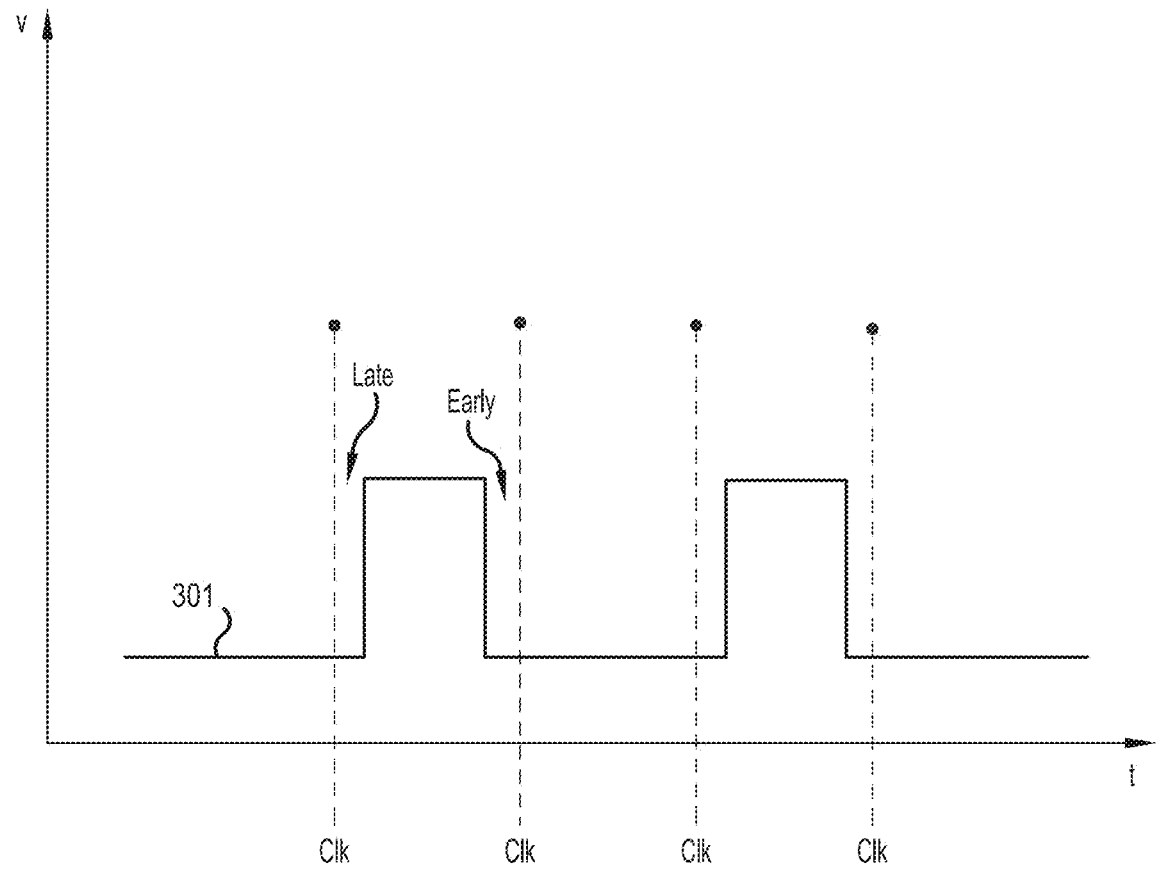
FIG. 3 is a pulse diagram for reference in describing an example data stream that exhibits even/odd jitter (EOJ)

Jitter can be decomposed into different types. One type is called even/odd jitter. Even/odd jitter can happen for example when the data-generating clock has duty-cycle distortion. This means that the rising edge of the clock is always a little late, while the falling edge of the clock is always a little early (or vice-versa). An example of this is shown in FIG. 3 where a data stream 301 exhibits EOJ. The consequence is that those bits, also known as symbols, generated by the rising edge of the clock will also be late, while those generated by the falling edge of the clock will also be early. In other words, every other symbol will either be early or late. For example, all odd-indexed symbols (i.e. the $1^{st}$, $3^{rd}$, $5^{th}$, etc.) might be early, while all even-indexed symbols (i.e. the $2^{nd}$, $4^{th}$, $6^{th}$, etc.) will be late. The difference between these two timing biases is defined as even/odd jitter (EOJ).

Most jitter measurements are made using repeating test data patterns, which are prescribed sequences of symbol values. A pattern for example might consist of 511 symbols selected from a pseudo-random distribution. Patterns are selected to stress different parameters or simulate different situations.

The primary challenge in estimating EOJ is that the measurement is confounded by data-dependent jitter (DDJ). DDJ is a consequence of intersymbol interference, which in turn is a consequence of real-world data channels, all of which have a finite bandwidth and may also create reflections and other forms of interference. Channels distort the shape of the data waveform, and this distortion alters the timing of edges, and therefore creates jitter. What's important here is that, because the data is created from a repeating test pattern, the distortion tends to happen the same way for each pattern. For example, it might mean that the $1^{st}$ edge in the pattern is always a little early, the $2^{nd}$ is also a little early, the $3^{rd}$ is a little late, etc. That is a purely hypothetical example, but it illustrates the point that the jitter is correlated with the pattern. In other words, the timing of each symbol in the pattern will have a specific bias. That bias depends on the symbol location in the pattern, whereas for EOJ the bias depends on whether the symbol index is even or odd.

The method most often used for computing EOJ relies on the use of odd-length test patterns. The IEEE ethernet specification, for example, uses a pattern that is 8191 symbols long. Why does that help? Let's look first at DDJ. The first symbol in each pattern has a jitter bias equal to ddj1, where ddj1 is the average jitter due to this symbol being the first in the pattern. The second symbol in each pattern has a jitter bias equal to ddj2, and so forth. Now let's look at EOJ. Let's define the first symbol in the first pattern as having an even index, and accordingly, it will have a jitter bias equal to ej. The second symbol has an odd index, so it has a jitter bias equal to oj. If the pattern length is odd, then the first and second symbols in the next pattern will be opposite to the first, meaning that the first symbol in the pattern now has an even jitter bias ej, and the second has an odd jitter bias oj.

If we now combine DDJ with EOJ, the first symbol in the first pattern has jitter equal to, $$j1 = ddj1 + ej$$

while the first symbol in the second pattern has jitter equal to, $$j2 = ddj1 + oj$$

If we now subtract those two jitter values, we get, $$j1 - j2 = dj1 - dj1 + oj - ej = oj - ej.$$

We can then define, $$EOJ = \mathrm{abs}(oj - ej) = \mathrm{abs}(j1 - j2).$$

The lesson here is that an odd length pattern allows us to subtract out the data-dependent jitter, so we're left with only EOJ. The process is usually repeated for all symbols in the pattern, increasing the number of statistical samples. Other variations also exist, but they are arithmetically the same.

On the other hand, for even-length patterns, we cannot subtract out the data-dependent jitter, because each pattern has the same biases, both for DDJ and EOJ. There is no direct way to separate the two. However, prior solutions rely on an approach where one assumes that the average DDJ for even edges is equal to the average DDJ for odd edges, and therefore, one can once again subtract out the DDJ, at least approximately.

This method is carried out as follows. First, compute timing errors for all odd edges, which is the set, $SO=\{ddj1+oj, ddj3+oj, ddj5+oj, \text{etc.}\}$.

The mean value of this set will be:

$\text{mean}(SO)=\text{mean}\{oj,oj,oj,\text{etc.}\}+\text{mean}(\{ddj1,ddj3,ddj5, \text{etc.}\})=oj+\text{mean}(oddDDJ)$, where mean(oddDDJ) is just the mean DDJ value for all odd symbols in the pattern. We can do the same for the even edges, $SE=\{ddj2+ej, ddj4+ej, ddj6+ej, \text{etc}\}$, $\text{mean}(SE)=\text{mean}\{ej,ej,ej,\text{etc.}\}+\text{mean}(\{ddj2,ddj4,ddj6, \text{etc.}\})=ej+\text{mean}(evenDDJ)$.

We then subtract the two results, which gives:

$\text{mean}(SO)-\text{mean}(SE)=(oj-ej)+(\text{mean}(oddDDJ)-\text{mean}(evenDDJ))$.

So long as the mean value of DDJ for even edges is about the same as the mean value of DDJ for odd edges, then mean(oddDDJ)−mean(evenDDJ) is approximately zero, and we can compute EOJ by taking the absolute value, $EOJ=\text{abs}(\text{mean}(SO)-\text{mean}(SE))=\text{abs}(oj-ej)$.

One disadvantage of all previous methods is that they require measuring timing at each edge in the pattern. This is usually done by defining a voltage threshold, and looking for the time when an edge crosses this threshold, as in FIG. 2. This requires work and is sensitive to the choice of threshold.

More importantly, newer standards rely on faster and faster data rates, and longer channels, which can lead to waveforms that are very difficult to measure timing and jitter. In terms of eye-diagram analysis, these waveforms may have closed eyes, and so it is difficult to find edges, especially for multi-level encoding schemes such as PAM4, which uses four different voltage levels, as prescribed in IEEE and PCIe, or even PAM3 as prescribed in USB. Defining a single, usable threshold is generally not possible.

Instead, each edge must be handled separately, which has led industry standards to focus on so-called 12-edge jitter. In 12-edge jitter, for PAM4, the 0-1 transition is measured at a single location in the pattern, as are the 1-0, 0-2, 2-0, etc. transitions. Thus, even if you have a pattern with thousands of transitions, the measurement uses only 12 of those transitions per pattern.

This leads to a huge drop in collected data statistics. The consequence for EOJ, with even length patterns, is that we can no longer assume that mean(oddDDJ)−mean(evenDDJ)=0. That can only be true if we are measuring hundreds or thousands of edges in the pattern, so that the distributions tend to the same mean (ideally zero). With 12 edge jitter, we use only around 6 even edges and around 6 odd edges. That is not enough to "average out" the DDJ.

As described above, odd-length patterns are well-suited for computing EOJ, because they allow EOJ to be mathematically separated from DDJ. In other words, we can decompose general jitter measurements into these two categories of EOJ or DDJ. Some specifications, however, such as PCIe, now rely on even-length patterns, and in these cases, it is not possible to directly separate EOJ from DDJ. The two biases confound each other.

The inventive concepts described next provide a method for computing EOJ on even-length test data patterns.

The inventive concepts are based on a so-called pulse-fit, or pulse response, analysis, already in use in the IEEE, PCIe, and USB specs, although it is not used for computing EOJ. The pulse-fit vector is a model for how a typical symbol might look in the waveform. It is defined mathematically as $y=p*x$, where y is the set of measured waveform samples, p is the pulse-fit vector (similar to a filter), x is a set of idealized waveform samples based on true, or correct symbol values as defined by the test pattern, and '*' denotes convolution. The pulse-fit vector p thus shows how to map an ideal waveform onto a real, measured waveform. It captures the channel effects of intersymbol interference and can be thought of as one way to define a channel model.

Figure 4:
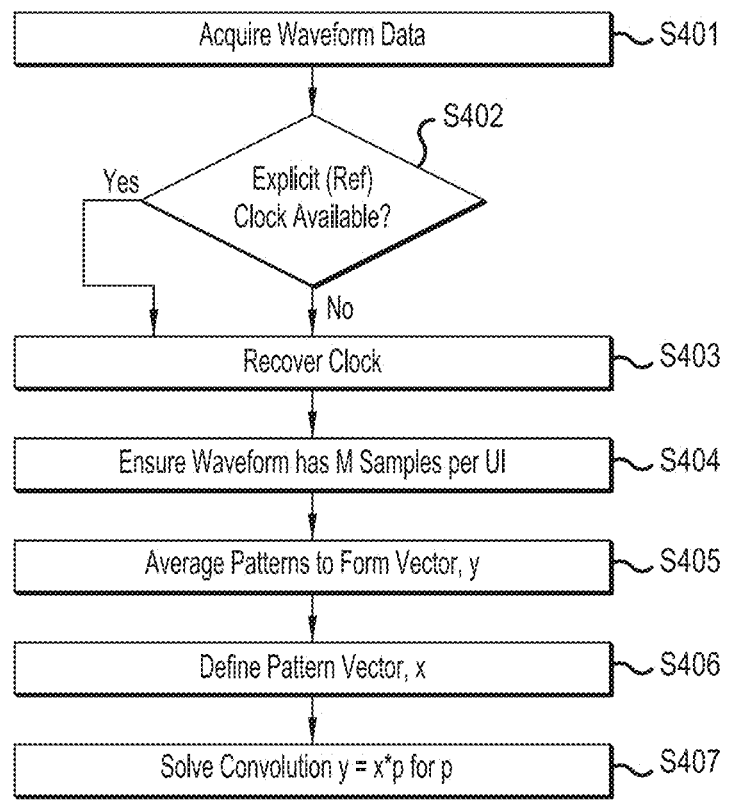
FIG. 4 shows a flow chart for reference in describing the computing of the pulse response of waveform samples acquired by an oscilloscope.
Figure 5:
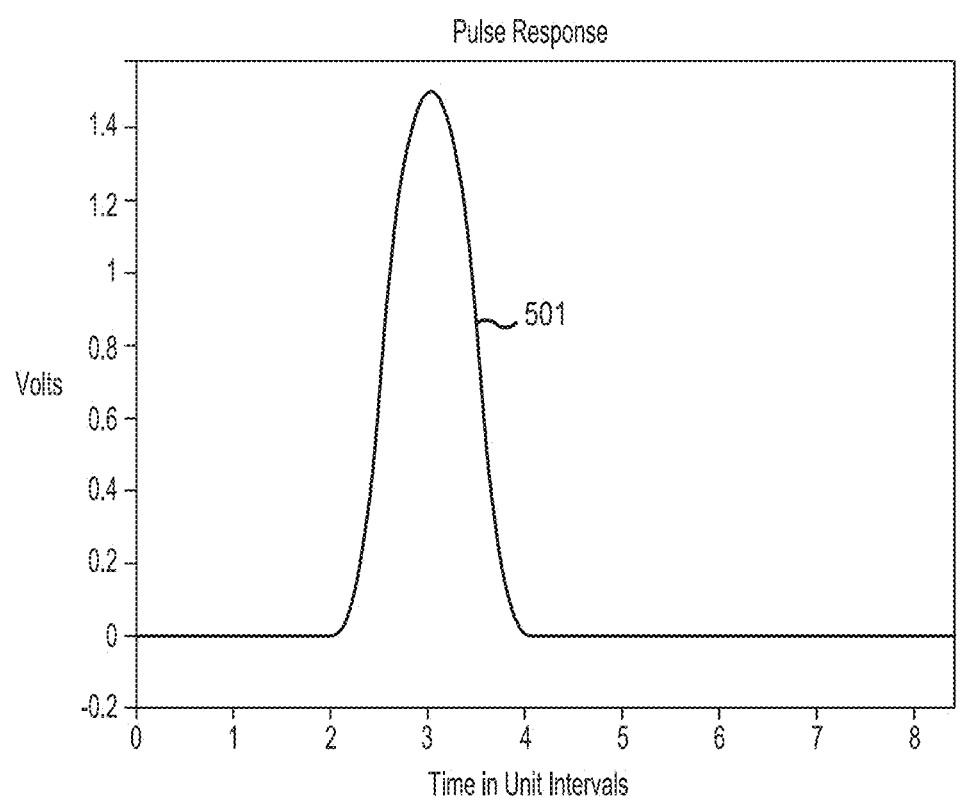
FIG. 5 illustrates an exemplary pulse response obtained by the computations of FIG. 4.

The procedure for computing the pulse response is well-known in the industry, but for reference, FIG. 4 shows a flow chart for how it is done, and FIG. 5 illustrates an example of a pulse response 501. Referring to FIG. 4, the first step (S401) in computing pulse response is to acquire waveform samples using the oscilloscope. If a reference clock (explicit clock) is not available (no at S402), then a clock must be derived from the acquired waveform using signal processing methods (S403), as are well-known in the industry. In the next step (S404), the method makes sure the waveform has an integer number of samples, M per unit interval (UI). If it does not, then the waveform must be resampled. In the next step (S405), the waveform is averaged over the length of a pattern, or in other words, multiple, pattern-length sections of waveform data are averaged together. In the next step (S406), a pattern vector x is defined, which is simply a list of symbols, or ideal voltage values, i.e. x=[−1, 1, 1, −1, 1, . . . ]. In the final step (S407), a linear system of equations is used to solve the convolution $y=p*x$, for pulse-fit p.

A modification to this approach, known in the industry, is to split the analysis in half, and perform one pulse-fit on all even symbols in the waveform, and another on the odd symbols, which is written as $y=pe*xe+po*xo$. This leads to a more accurate model when waveforms have non-negligible EOJ on them, and therefore improves the accuracy of various metrics that depend on the pulse-fit, such as signal-to-noise distortion ratio (SNDR).

The inventive concepts utilize this analysis to measure EOJ, rather than just mitigate its effects in measurements such as SNDR. In fact, EOJ can be estimated by measuring and comparing the width of the two pulse-fit vectors pe and po. When EOJ is present, even symbols are on average wider than odd symbols (or vice-versa), which is a consequence of duty-cycle distortion on the data generating clock, as explained above. Since one pulse-fit vector (pe) is constructed for even symbols, and the other (po) is for odd, the width of these pulses will reflect that same bias. Specifically, we can define:

$EOJ=\text{abs}((\text{width}(pe)-\text{width}(po))/2)$.

Figure 6:
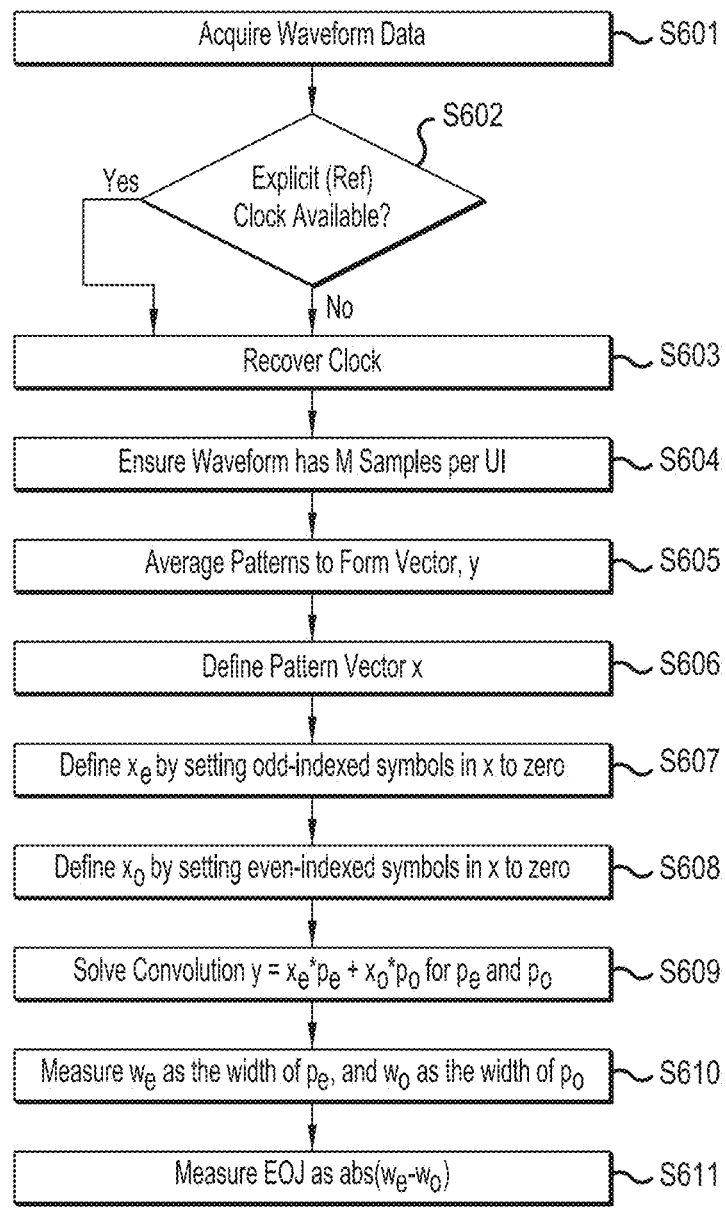
FIG. 6 is a flowchart for reference in describing a method of measuring EOJ according to an embodiment of the inventive concepts.

FIG. 6 is a flowchart for reference in describing a method of measuring EOJ according to an embodiment of the inventive concepts.

The first six steps (S601 through S606) of FIG. 6 are the same as the first six steps (S401 through S406) of FIG. 4 described above.

In the dual pulse-fit method of the inventive concepts, the next steps (S607 and S608) create two versions of the pattern vector x. First (S607), xe is defined by setting all odd-indexed symbols in x to zero, then (S608) xo is defined by setting all even-indexed symbols in x to zero. It will be understood that steps S607 and S608 can be executed in reverse order or in parallel.

In the next step (S609), a linear system of equations is used to solve the convolution $y=xe*pe+xo*po$, for pe and po.

In the next step (S610), the width we of pe is measured by finding the crossings of the pulse at some appropriate vertical threshold, such as where the pulse has 50 percent of its maximum value. The width wo of po is measured similarly.

Finally (S611), EOJ is measured as the absolute value of the difference between these widths, $$EOJ=abs(we-wo).$$

Figure 7:
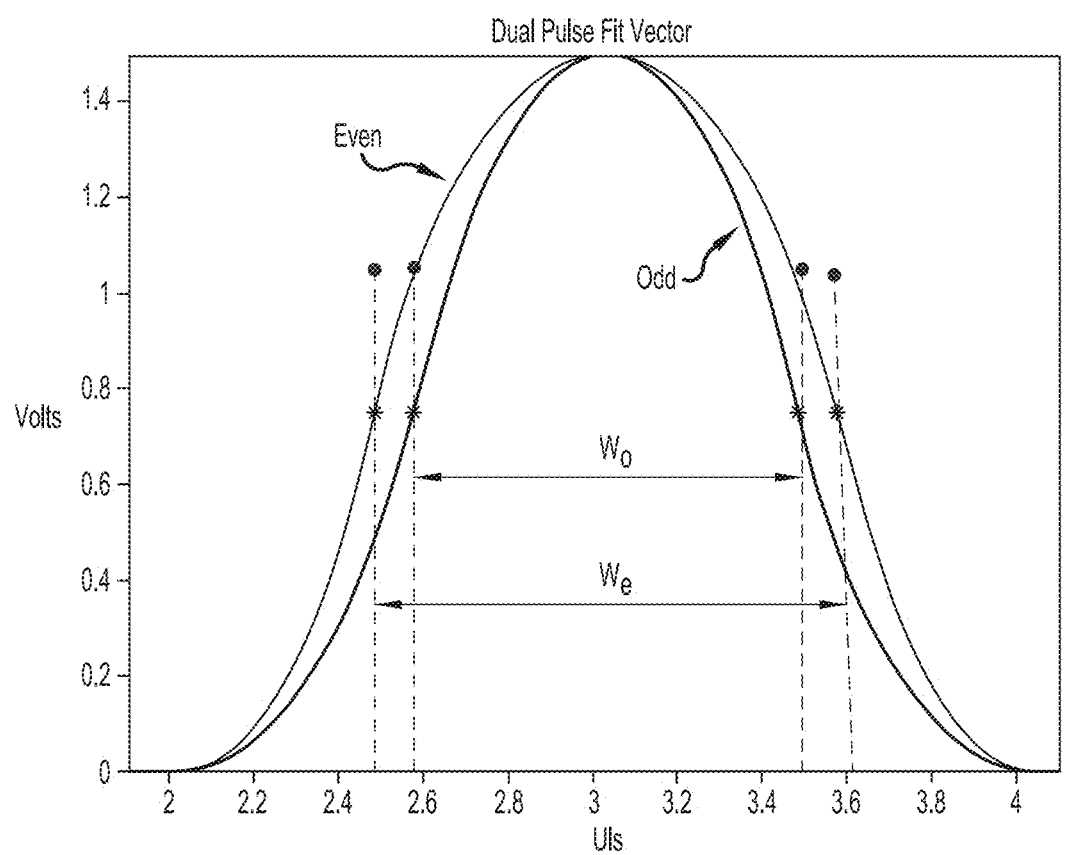
FIG. 7 illustrates examples pulse-fit vectors for a simulated waveform associated with the method of FIG. 6.

FIG. 7 shows exemplary odd and even pulse-fit vectors for a simulated waveform. The markers on the plot show where the pulse crossed the 50 percent vertical threshold and is the location where the widths wo and we of the two pulses are measured. The absolute value of the difference between the two widths wo and we constitutes the EOJ.

One advantage of the inventive concepts is that does not rely on measuring jitter, which for PAM4 waveforms, long channels, and closed eyes, is very difficult, and has thus been relegated to measuring only a few (12) edges per pattern. Because computing pulse-fit is simpler, it uses every symbol in the pattern. Note that these pulse-fit vectors will be affected by DDJ, but because we can now accumulate a large number of symbols in each pattern, we have sufficient statistics to average out DDJ. In other words, we can now again assume that mean(oddDDJ)−mean(evenDDJ)=0.

In addition, the method of computing EOJ of the inventive concepts works for even length patterns, on modern waveforms such as PCIe, which are based on PAM4, and which have closed eyes.

It is noted that the method described above may be modified in a number of ways without departing from the spirit and scope of the inventive concepts. For example, the manner in which the pulse-fits are computed may be altered. Different linear algebra solvers offer a variety of pros and cons such as speed versus accuracy. Further, the manner in which the pulse-fit width is determined may be altered. For example, one might compute the width at various heights, or thresholds, and average, or use some other aggregation of results. Still further, the manner in which the difference between widths is measured may be altered. For example, the terms in the subtraction might be rearranged to minimize numerical loss of precision.

The methods of the inventive concepts may be implemented by the processor of an oscilloscope, such as the oscilloscope above in connection with FIG. 1. Alternatively, the waveform data may be acquired by an oscilloscope, and the EOJ computed by a processor remotely of the oscilloscope. Further, the inventive concepts encompass non-transitory computer readable storage media having instructions stored therein that when executed by a processor cause the processor to carry out the methods of computing EOJ of the inventive concepts. The encompass non-transitory computer readable storage media may be embedded within oscilloscope or external the oscilloscope.

Further, the inventive concepts encompass oscilloscopes configured to acquire the waveform of a signal under test (SUT) and programmed to carry out the methods of computing EOJ of the inventive concepts.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. While representative embodiments are disclosed herein, one of ordinary skill in the art will appreciate that many variations that are in accordance with the present teachings are possible and remain within the scope of the appended claim set. The invention therefore is not to be restricted except within the scope of the appended claims.

What is claimed is:

1. A method for measuring even/odd jitter (EOJ) in digital signals, comprising:
   receiving a signal under test (SUT), the SUT including a waveform of even symbols and odd symbols constituting an even-length test pattern;
   generating a first pulse-fit vector for the even symbols of the waveform and a second pulse-fit vector for odd symbols of the waveform; and
   determining the EOJ of the SUT by measuring and comparing respective widths of the first and second pulse-fit vectors.

2. The method of claim 1, wherein the first pulse-fit vector and the second pulse-fit vector are generated using a pulse-fit analysis.

3. The method of claim 2, wherein the pulse-fit analysis is based on a model symbol for the waveform.

4. The method of claim 3, wherein the model symbol is defined as y=xe*pe+xo*po, where y is a set of waveform samples, pe is a pulse-fit vector for the even symbols, po is a pulse-fit vector for the odd symbols, xe is a set of idealized waveform samples based on even symbol values as defined by the test pattern, xo is a set of idealized waveform samples based on odd symbol values as defined by the test pattern, and * denotes convolution.

5. The method of claim 1, wherein the respective widths of the first and second pulse-fit vectors are measured at 50 percent of a height of the first and second pulse-fit vectors.

6. The method of claim 5, wherein the EOJ is determined as the absolute value of (we−wo)/2,
   where we is the width of the first pulse-fit vector, and wo is the width of the second pulse-fit vector.

7. The method of claim 1, wherein the first and second pulse-fit vectors are generated from a given number of even and odd symbols of the waveform,
   wherein the waveform includes at least data dependent jitter (DDJ) in addition to the EOJ, and
   wherein the given number of even and odd symbols is sufficiently high such that mean(oddDDJ)−mean(evenDDJ)≈0,
   where mean(oddDDJ) is a mean DDJ of the odd symbols and mean(evenDDJ) is a mean DDJ of the even symbols.

8. The method of claim 1, wherein the method is implemented by a processor of an oscilloscope, the oscilloscope having an input port receiving the SUT.

9. The method of claim 8, wherein the SUT is generated by a device under test (DUT).

10. The method of claim 9, wherein the DUT is an oscillator.

11. A non-transitory computer readable medium storing instructions which when executed by a processor cause the processor to carry out the method of claim 1.

12. The non-transitory computer readable medium of claim 11, wherein the first pulse-fit vector and the second pulse-fit vector are generated using a pulse-fit analysis.

13. The non-transitory computer readable medium of claim 11, wherein the processor is embedded in an oscilloscope.

14. An oscilloscope, comprising:
   an input port configured to receive a signal under test (SUT), the SUT including a waveform of even symbols and odd symbols constituting an even-length test pattern;

a sampling circuit configured to sample the waveform of even symbols and odd symbols, and to output a digital signal corresponding to the waveform of even symbols and odd symbols; and a processor configured to process the digital signal by measuring even/odd jitter (EOJ) of the SUT by generating a first pulse-fit vector for the even symbols of the waveform and a second pulse-fit vector for odd symbols of the waveform, and by determining the EOJ of the SUT by measuring and comparing respective widths of the first and second pulse-fit vectors.

15. The oscilloscope of claim 14, wherein the first pulse-fit vector and the second pulse-fit vector are generated using a pulse-fit analysis.

16. The oscilloscope of claim 15, wherein the pulse-fit analysis is based on a model symbol for the waveform.

17. The oscilloscope of claim 16, wherein the model symbol is defined as y=xe*pe+xo*po, where y is a set of waveform samples, pe is a pulse-fit vector for the even symbols, po is a pulse-fit vector for the odd symbols, xe is a set of idealized waveform samples based on even symbol values as defined by the test pattern, xo is a set of idealized waveform samples based on odd symbol values as defined by the test pattern, and * denotes convolution.

18. The oscilloscope of claim 14, wherein the respective widths of the first and second pulse-fit vectors are measured at 50 percent of a height of the first and second pulse-fit vectors.

19. The oscilloscope of claim 18, wherein the EOJ is determined as the absolute value of (we−wo)/2,
where we is the width of the first pulse-fit vector, and wo is the width of the second pulse-fit vector.

20. The oscilloscope of claim 14, wherein the first and second pulse-fit vectors are generated from a given number of even and odd symbols of the waveform,
wherein the waveform includes at least data dependent jitter (DDJ) in addition to the EOJ, and
wherein the given number of even and odd symbols is sufficiently high such that mean(oddDDJ)−mean(evenDDJ)≈0,
where mean(oddDDJ) is a mean DDJ of the odd symbols and mean(evenDDJ) is a mean DDJ of the even symbols.

* * * * *